United States Patent
Horii et al.

(10) Patent No.: US 9,128,836 B2
(45) Date of Patent: Sep. 8, 2015

(54) TECHNIQUE FOR ACCURATELY DETECTING SYSTEM FAILURE

(75) Inventors: Hiroshi Horii, Yamato (JP); Hideki Tai, Yokohama (JP); Gaku Yamamoto, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 13/252,009

(22) Filed: Oct. 3, 2011

(65) Prior Publication Data

US 2012/0023366 A1     Jan. 26, 2012

Related U.S. Application Data

(63) Continuation of application No. 11/964,858, filed on Dec. 27, 2007, now abandoned.

(30) Foreign Application Priority Data

Dec. 27, 2006    (JP) .................................. 2006-350936

(51) Int. Cl.
*G06F 15/16*       (2006.01)
*G06F 11/07*       (2006.01)

(52) U.S. Cl.
CPC ........ *G06F 11/0751* (2013.01); *G06F 11/0709* (2013.01)

(58) Field of Classification Search
CPC .................................................. G06F 11/3055
USPC ......................................................... 709/224
See application file for complete search history.

(56) References Cited

U.S. PATENT DOCUMENTS

| | | | |
|---|---|---|---|
| 4,817,092 A | 3/1989 | Denny | .............. H04M 3/24 |
| 6,996,583 B2 | 2/2006 | Wilmot | ............ G06F 17/30575 |
| 2002/0075304 A1* | 6/2002 | Thompson et al. | ........... 345/751 |
| 2002/0075306 A1* | 6/2002 | Thompson et al. | ........... 345/753 |
| 2002/0087857 A1 | 7/2002 | Tsao | ....................... G06F 21/32 |
| 2002/0156828 A1* | 10/2002 | Ishizaki et al. | ................ 709/201 |

(Continued)

FOREIGN PATENT DOCUMENTS

| | | |
|---|---|---|
| JP | 11-008623 A | 1/1999 |
| JP | 2001-356972 A | 12/2001 |

(Continued)

*Primary Examiner* — Natisha Cox
(74) *Attorney, Agent, or Firm* — Ido Tuchman; William J. Stock

(57) ABSTRACT

An apparatus, method and program for dividing a conversational dialog into utterance. The apparatus includes a computer processor; a word database for storing spellings and pronunciations of words; a grammar database for storing syntactic rules on words; a pause detecting section which detects a pause location in a channel making a main speech among conversational dialogs inputted in at least two channels; an acknowledgement detecting section which detects an acknowledgement location in a channel not making the main speech; a boundary-candidate extracting section which extracts boundary candidates in the main speech, by extracting pauses existing within a predetermined range before and after a base point that is the acknowledgement location; and a recognizing unit which outputs a word string of the main speech segmented by one of the extracted boundary candidates after dividing the segmented speech into optimal utterance in reference to the word database and grammar database.

11 Claims, 10 Drawing Sheets

(56) References Cited

U.S. PATENT DOCUMENTS

2005/0119996 A1* 6/2005 Ohata et al. .................. 707/3
2008/0046500 A1* 2/2008 Kato et al. .................. 709/201

FOREIGN PATENT DOCUMENTS

| | | |
|---|---|---|
| JP | 2003-186833 A | 7/2003 |
| JP | 2003-196178 A | 7/2003 |

* cited by examiner

| SERVER IDs | OPERATION STATUSES | VERSION IDs |
|---|---|---|
| SERVLET SERVER 110-1 | NORMAL STATUS | |
| SERVLET SERVER 110-2 | NORMAL STATUS | |
| SERVLET SERVER 110-3 | NORMAL STATUS | |
| SERVLET SERVER 110-4 | NORMAL STATUS | |
| APP SERVER 120-1 | SUSPICIOUS HEAVY-LOAD STATUS | |
| APP SERVER 120-2 | NORMAL STATUS | 5 |
| APP SERVER 120-3 | NORMAL STATUS | |
| DB SERVER 130 | NORMAL STATUS | |
| ⋮ | ⋮ | |

| TIMES | 0 | 1 | 2 | 3 | 4 |
|---|---|---|---|---|---|
| VERSION IDs | 0 | 0 | 1 | 1 | 1 |
| DISPATCHER APPARATUS 100-1 | A, B, C | A, B, C(-) | A, B, C(-) | A, B, C(-) | A, B, C(-) |
| DISPATCHER APPARATUS 100-2 | A, B, C | A, B, C | A, B(-), C | A, B, C(-) | A, B(-), C |
| SERVLET SERVER 110-1 | A, B, C | A, B, C | A, B, C(-) | A, B, C(-) | A, B, C(-) |

| TIMES | 5 | 6 | 7 | 8 | 9 | 10 |
|---|---|---|---|---|---|---|
| VERSION IDs | 2 | 2 | 2 | 2 | 3 | 3 |
| DISPATCHER APPARATUS 100-1 | A, B, C(-) | A, B(-), C | A, B(-), C | A, B(-), C | A, B(-), C | A, B-, C |
| DISPATCHER APPARATUS 100-2 | A, B(-), C | A, B(-), C | A, B(-), C | A, B(-), C | A, B(-), C | A, B-, C |
| SERVLET SERVER 110-1 | A, B(-), C | A, B(-), C | A, B(-), C | A, B(-), C | A, B-, C | A, B-, C |

FIG. 10

TECHNIQUE FOR ACCURATELY DETECTING SYSTEM FAILURE

CROSS-REFERENCE TO RELATED APPLICATIONS

This application claims priority under 35 U.S.C. §120 to U.S. patent application Ser. No. 11/964,858 filed Dec. 27, 2007, which claims priority under 35 U.S.C. §119 to Japanese Patent Application No. 2006-350936 filed Dec. 27, 2006, the entire text of which is specifically incorporated by reference herein.

BACKGROUND

The present invention relates to a technique for accurately detecting a system failure, and particularly relates to a technique for accurately detecting a failure in a system where a plurality of servers communicate with each other.

In recent years, a large scale website is provided not by a single server but by a system including a plurality of servers. This type of system is called a multi-tier server system, and includes a servlet server for performing control over an HTTP protocol, an application server for operating a called application, a database server for performing the transaction of a database, and the like. In order to detect a failure which occurs in this type of multi-tier server system, a server for monitoring provided separately from this server group, is conventionally used.

The server for monitoring regularly collects the status of a server in a system from each server. For example, the statuses of hardware such as a supply voltage, the temperature of a CPU and a CPU busy rate are collected. Thereafter, when the statuses are different from normal ones, it is judged that an anomaly is occurring in the system. However, a judgment as to an anomaly occurring in software may fail by using only this type of server for monitoring. For this reason, each server is made capable of detecting a software-based failure by measuring a time required for a transaction requested by the server to another server, and by judging whether or not the length of the required time is within a predetermined range.

Refer to the following Japanese Patent Application Laid-open Publication No. 2001-282759 and Japanese Patent Application Laid-open Publication No. 2003-196178 as referential techniques related to failure detection.

In the above-mentioned multi-tier server system, there is a case where a first server requests a second server for a transaction, and where the requested second server further requests a third server for the transaction. In this case, even if a transaction response returned to the first server is delayed, the first server cannot determine which one of the second and third servers has a failure. In such a case, if the first server determines that a failure occurs in the second server, and changes a transmission path for a transaction request and the like, the processing efficiency is likely to decrease unnecessarily.

Furthermore, when a program which is operated on a server is written in a Java language (a registered trademark), Java middleware may regularly perform garbage collection (GC). GC is processing for releasing a memory region which is reserved by a program but is no longer used, and is carried out independently from the operations of the program, and regularly, for example. In this case, although the processing in the server is temporarily delayed, it returns to the original state immediately after GC is completed. From the viewpoint of efficient use of a system, it is inconvenient to judge such a temporal state as a failure occurring in a server.

SUMMARY

Against this background, an object of the present invention is to provide a system, a method and a program which are capable of solving the above problems. The object can be achieved by using a combination of features recited in the independent claims in the scope of claims. In addition, the dependent claims specify more specific advantageous examples of the present invention.

In order to solve the above problems, in an aspect of the present invention, provided is a system including: a plurality of dispatcher apparatuses which dispatch a transaction requested by an external terminal apparatus; a plurality of first-tier servers which process the dispatched transactions; and at least one second-tier server which processes a part of the transaction in response to a request received from the first-tier server. Each of the dispatcher apparatuses includes: a storage device which stores a status table indicating an operation status of each second-tier server; a transferring unit which transfers a transaction request received from the external terminal apparatus to a first-tier server selected from the plurality of the first-tier servers, in order to dispatch the requested transaction; a table generator which receives the operation status of each of the second-tier servers included in a transaction response corresponding to the transferred transaction request, which evaluates the operation status of each of the second-tier servers based on the received operation status, which generates a status table indicating the operation status of each of the second-tier servers, and which stores the status table in the storage device; a table transmitter which reads the generated status table from the storage device in response to the generation of the status table, and which transmits the status table to each of the first-tier servers; and a first table updating unit which updates the status table stored in the storage device by use of the received status table in response to the reception of the status table from any of the first-tier servers. Each of the first-tier servers includes: a storage device which stores a status table indicating an operation status of each second-tier servers; a request transmitter which transmits the transaction request to the second-tier server in response to the reception of the transaction request transferred from the transferring unit of one of the dispatcher apparatuses, in order to cause the second-tier server to process a part of the requested transaction; a status returning unit which returns, to the dispatcher apparatus, the status of the transaction response to the transaction request transmitted to the second-tier server, as the operation status of the second-tier server, the status of the transaction response included in the transaction response to the transaction request transferred from the transferring unit of the dispatcher apparatus; a second table updating unit which updates a status table already stored in the memory by use of the status table received from the status table from the table transmitter of the dispatcher apparatus, in response to the reception of the status table; and a table returning unit which returns the updated status table to each of the dispatcher apparatuses, in response to the update of the status table. Moreover, provided are a method for managing the status of each server by use of the system, and a program for allowing a plurality of information processing apparatuses to function as the system.

Note that the above mentioned summary of the invention does not cite all the necessary characters of the present invention, and that a subcombination of the groups of these characters can be the present invention.

BRIEF DESCRIPTION OF THE DRAWINGS

For a more complete understanding of the present invention and the advantage thereof, reference is now made to the following description taken in conjunction with the accompanying drawings.

FIG. 5 shows an example of a data structure of a status table stored in a storage device 300 or 400.

FIG. 10 shows a process of operation statuses sequentially updated by the information system 10 according to the present invention.

DETAILED DESCRIPTION

Hereinafter, the present invention will be described by using an embodiment of the present invention. However, the following embodiment does not limit the present invention recited in the scope of claims, and all the combinations of features described in the embodiment are not always necessary for solving means of the present invention.

Figure 1:
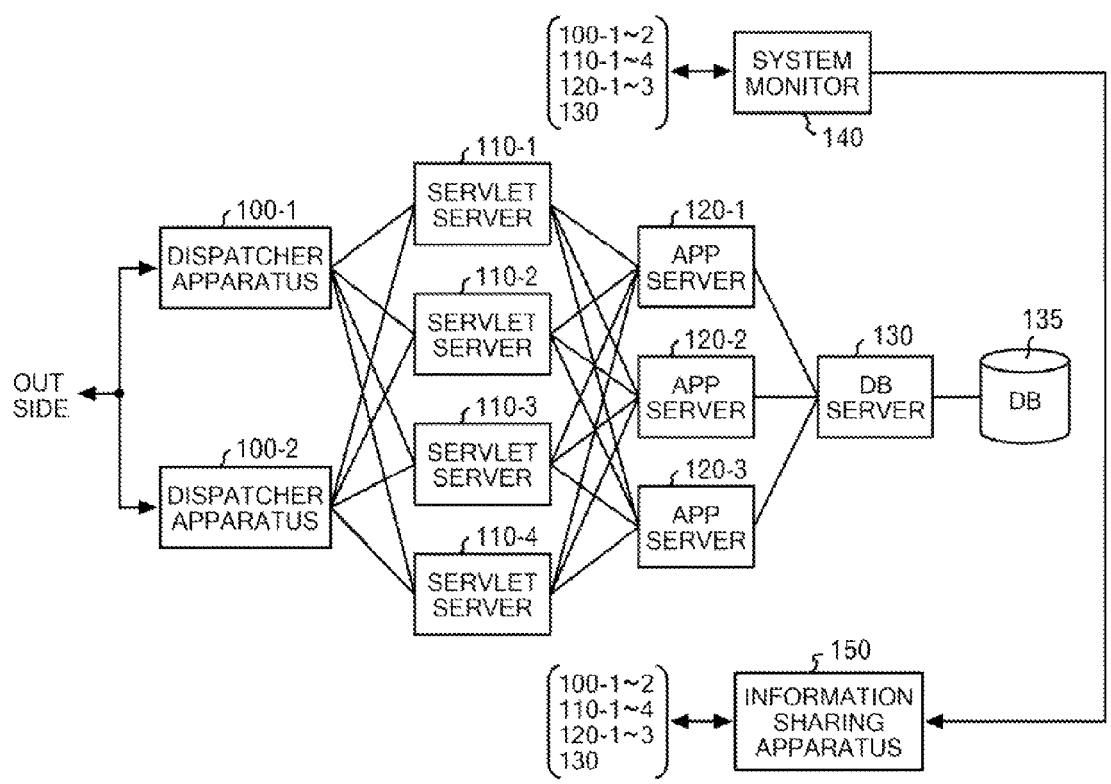
FIG. 1 shows an example of a configuration of an information system 10.

FIG. 1 shows an example of a configuration of an information system 10. The information system 10 includes dispatcher apparatuses 100-1 to -2, servlet servers 110-1 to -4, APP servers 120-1 to -3, a DB server 130, a database 135, a system monitor 140, and an information sharing apparatus 150. Each of the dispatcher apparatuses 100-1 to -2 is directly connected to the servlet servers 110-1 to -4. In addition, the dispatcher apparatuses 100-1 to -2 dispatch transactions requested by an external terminal apparatus to the servlet servers 110-1 to -4.

For example, each of the dispatcher apparatuses 100-1 to -2 may transfer transaction requests which are sequentially received to each of the servlet servers 110-1 to -4 by a round-robin method. In other words, the dispatcher apparatus 100-1 transfers a first-received transaction request, a second-received transaction request, a third-received transaction request, and a fourth-received transaction request to the servlet server 110-1, the servlet server 110-2, the servlet server 110-3, and the servlet server 110-4, respectively. From the fifth, starting from first again, a transaction request is transferred to the servlet server 110-1.

Each of the servlet servers 110-1 to -4 is an example of a first-tier server according to the present invention. Specifically, they are HTTP servers and the like. Furthermore, each of the servlet servers 110-1 to -4 performs processing in response to transaction requests dispatched from the dispatcher apparatuses 100-1 to -2. There may be a case where a need to call a predetermined application program or to access a database arises during the processing. In such a case, each of the servlet servers 110-1 to -4 further transmits transaction requests to the APP (application) servers 120-1 to -3 or the DB server 130, and causes them to process at least a part of transactions requested by an external terminal apparatus. Each of the APP servers 120-1 to -3 is an example of a second-tier server according to the present invention, and processes a part of transactions requested by an external terminal apparatus in response to requests from the servlet servers 110-1 to -4. The DB server 130 may read data from the database 135 during the processing, or may update the database 135. Incidentally, the DB server 130, too, is an example of the second-tier server. In other words, the second-tier servers include a server which receives a request indirectly via another server/apparatus (here, the APP servers 100-1 to -3) and processes a part of requested transactions in response to the request, other than a server which receives a request directly from the servlet server.

The system monitor 140 receives data showing the status of each of the following apparatuses/servers from agent software operating in the dispatcher apparatuses 100-1 to -2, the servlet servers 110-1 to -4, the APP servers 120-1 to -3, and the DB server 130, and the like. For example, data showing the following will be received in the system monitor 140: a CPU utilization in each apparatus/server; an operation status of a hardware such as an access frequency of a hard disk drive; and a physical status such as temperatures of a CPU and a housing. Then, the information sharing apparatus 150 judges as to whether or not an anomaly occurs in any of the apparatuses/servers included in the information system 10 according to each pieces of data received by the system monitor 140. Thereafter, the information sharing apparatus 150 performs processing, such as notifying the judgment result to the outside and halting the apparatus/server in which the anomaly has occurred.

According to the information system 10 shown in FIG. 1, it is conceivable that an anomaly which has occurred in the information system 10 can be detected by monitoring the status of each apparatus/server in the information system 10. However, there is a case where an anomaly caused mainly by software cannot be detected appropriately, due to the configuration of this type of information system 10. For example, in a case of deadlock whose cause is a failure such as a design for software, the software itself is operating normally as designed, so that the failure occurrence cannot be detected appropriately due to the status of a CPU and the like. Moreover, the system monitor 140 and the information sharing apparatus 150 are necessary in addition to an originally necessary server/apparatus. Hence, even if the other servers/apparatuses are normal, there is a possibility that an anomaly is mistakenly detected due to the abnormalities of the system monitor 140 and the information sharing apparatus 150 themselves.

On the other hand, according to the information system 10 which will hereinafter be described, it is possible to detect various kinds of abnormalities without having a bad effect on the original operations of the information system 10, by incorporating a mechanism for detecting an anomaly into a mechanism for transmitting and receiving a transaction request and a transaction response.

The descriptions will hereinafter be given in detail.

Figure 2:
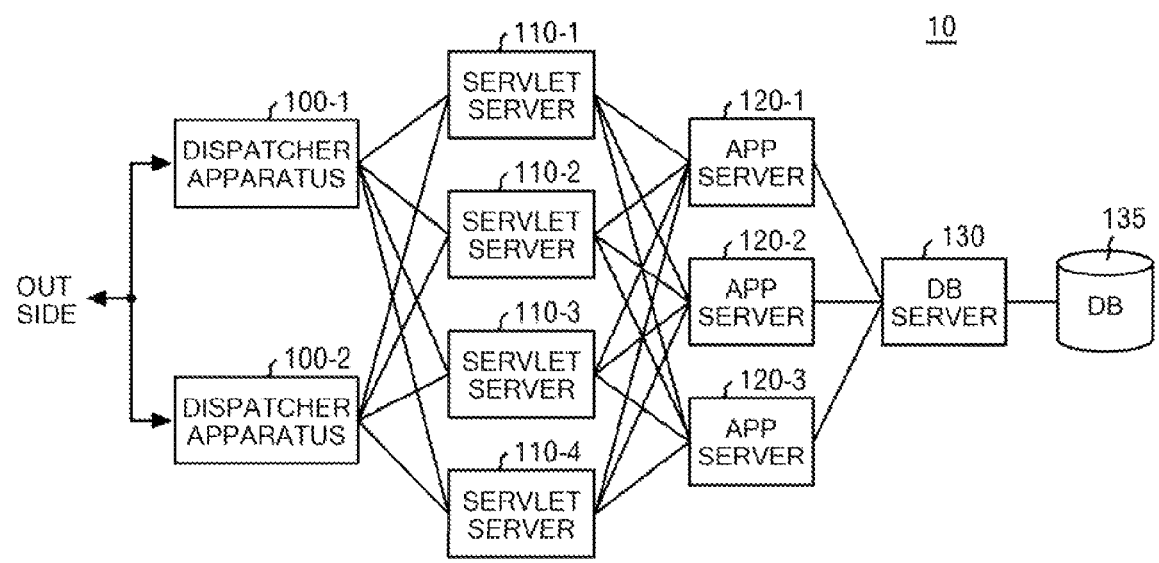
FIG. 2 shows an entire configuration of the information system 10 according to the present embodiment.

FIG. 2 shows an entire configuration of the information system 10 according to the embodiment. As in FIG. 1, the information system 10 includes the dispatcher apparatuses 100-1 to -2, the servlet servers 110-1 to -4, the APP servers 120-1 to -3, the DB server 130, and the database 135. However, different from the information system 10 shown in FIG. 1, the information system 10 in FIG. 2 may not include the system monitor 140 and the information sharing apparatus 150. The overview of processing in each of the dispatcher apparatuses 100-1 to -2, the servlet servers 110-1 to -4, the APP servers 120-1 to -3, the DB server 130, and the database 135 is the same as those described in FIG. 1. However, each server/apparatus performs processing for detecting an anomaly, in addition to the reception/transmission of a transaction request and a transaction response. Moreover, each server/apparatus includes a mechanism used to detect an anomaly, and this mechanism measures a time required from transmission of a transaction request to another server/apparatus until reception of the transaction response thereof.

Figure 3:
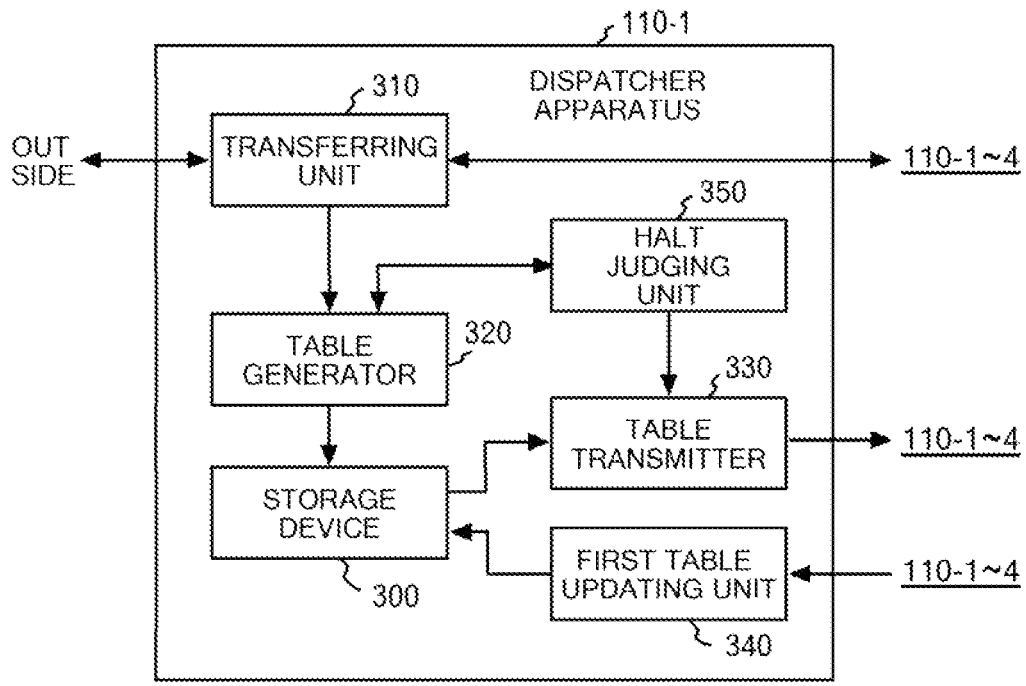
FIG. 3 shows a functional configuration of a dispatcher apparatus 100-1.

FIG. 3 shows a functional configuration of the dispatcher apparatus 100-1. The dispatcher apparatus 100-1 has a storage device 300, a transferring unit 310, a table generator 320, a table transmitter 330, a first table updating unit 340, and a halt judging unit 350. Firstly, simple descriptions will be given of a relation between each of these members and hardware resources. The storage device 300 stores information necessary for each of the other members, and is realized by a RAM 1020 or a hard disk drive 1040, both of which will be described later. The transferring unit 310 and the table transmitter 330 transmit and receive information, and are carried out by causing a CPU 1000 and a communication interface 1030, which will be described later, to operate in accordance with an installed program. The table generator 320, the first table updating unit 340, and the halt judging unit 350 are to judge on the operation, processing, and condition of information, and are performed by causing the CPU 1000 described later to operate in accordance with an installed program.

The memory 300 is provided to store a status table showing the operation status of each apparatus/server. Specifically, the status table indicates the operations status of each of the servlet servers 110-1 to -4, the APP servers 120-1 to -3, and the DB server 130. In addition, the operation status is any one of a normal status, a heavy-load status in which the server is in operation but requires a time equal to or more than a threshold value for processing, an abnormal status in which the server is out of operation, a suspicious heavy-load status in which the server is suspected to be in a heavy-load status, and a suspicious abnormal status in which the server is suspected to be in an abnormal status.

The transferring unit 310 transfers a transaction request received from an external terminal apparatus to one of the servlet servers 110 selected from the plurality of servlet servers 110-1 to -4, in order to dispatch the requested transaction. As described above, the selection of the servlet server 110 may be performed by the round-robin method. The table generator 320 receives the operations status of each of the APP servers 120-1 to -3 and the DB server 130 included in the transaction response corresponding to the transferred transaction request.

Here, the reception of the operation status included in the transaction response is preferably the information which indicates a time required for processing requested by the servlet servers 110-1 to -4 to the APP servers 120-1 to -3 in response to the transaction request. In other words, in a case where the transferring unit 310 transfers a transaction request A to the servlet server 110-1, and where the servlet server 110-1 which has received the transaction request A transmits a transaction request B to the APP server 120-1 in response to the request A, a time required for processing corresponding to the transaction request B is received the time included in the transaction response A for the transaction request A.

As specific examples, each operation status can be described as follows: the abnormal status indicates that the required time is more than five seconds; the heavy-load status indicates that the required time is more than two seconds and less than or equal to 5 seconds; and the normal status indicates that the required time is less than or equal to two seconds. At the point of the reception by the table generator 320, the operation status may be a numeric value itself indicating such required time, or may be one which indicates each status already judged in response to the numeric value. Moreover, the operation status may be one which indicates another index value showing the status of processing in each server/apparatus other than the required time.

As an example of the index value, cited are throughput and latency of processing, and the like. Furthermore, the table generator 320 may be configured not to receive a time required for each processing as the operation status, but to receive an average time required for the plurality of transactions whose response are received for a fixed period of time as the operation status. Then, the table generator 320 evaluates the operation status of each of the APP servers 120-1 to -3 and the DB server 130 in response to the received operation status, generates a status table indicating each evaluated operation status, and stores the operation status in the memory 300.

The evaluation of the operation status may be processing to handle the received operation status itself of one APP server 120 as the operation status of the APP server 120, or may be processing to fix a single operation status in response to a plurality of operation statuses when the plurality of different operation statuses of the same APP server 120 are received. Moreover, the table generator 320 may evaluate the operation status of each servlet server 110 according to a time required from transmission of a transaction request to each of the servlet servers 110-1 to -4 until reception of the transaction response to the transaction request, and may generate a status table including the evaluated operation status.

The table transmitter 330 reads the generated status table from the memory 300 in response to the generation of the status table, and transmits the status table to each of the servlet servers 110-1 to -4. The first table updating unit 340 updates the status table already stored in the memory 300 by use of the received status table in response to the reception of the status table from any one of the servlet servers 110-1 to -4. The halt judging unit 350 stops the table generator 320 receiving the operation status and the table transmitter 330 transmitting the status table, on condition that the operation statuses of all of the servlet servers 110 are not in the normal statuses in the status table stored in the memory 300.

Note that descriptions will be omitted of each function which the dispatcher apparatus 100-2 has since the functions are approximately the same as those of the dispatcher apparatus 100-1.

Figure 4:
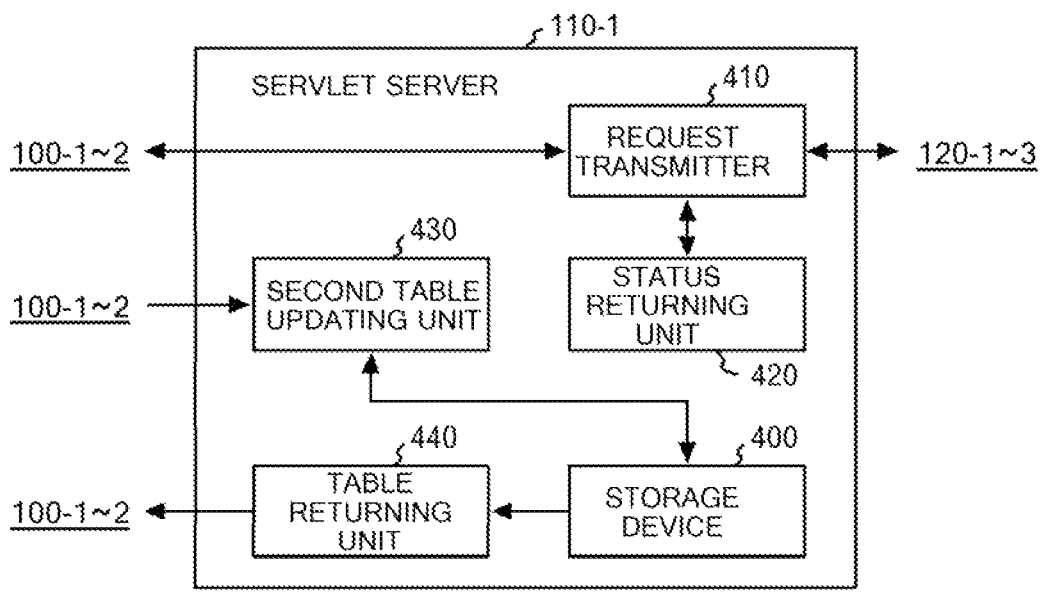
FIG. 4 shows a functional configuration of a servlet server 110-1.

FIG. 4 shows a functional configuration of the servlet server 110-1. The servlet server 110-1 has a storage device 400, a request transmitter 410, a status returning unit 420, a second table updating unit 430, and a table returning unit 440. Similarly to the case of the dispatcher apparatus 100-1, descriptions will firstly be given of a relation with hardware resource. The memory 400 stores information necessary for each of the other members. For example, the memory 400 is performed by the RAM 1020 or the hard disk drive 1040, both of which will be described later. The request transmitter 410 and the table returning unit 440 transmit and receive a transaction response and the like, and are carried out by causing the CPU 1000 and the communication interface 1030, both of which will be described later, to operate in accordance with an installed program. The status returning unit 420 and the second table updating unit 430 judge the operation, processing, and condition of information, and are performed by causing the CPU 1000, which will be described later, to be operated by an installed program.

The memory 400 is provided to store a status table which shows the operation status of each of the servlet servers 110-1 to -4, the APP servers 120-1 to -3, and the DB server 130. The request transmitter 410 transmits a transaction request to the APP server 120-1 to -3 or the DB server 130 (hereinafter, referred to as the APP server 120-1 and the like) in response to the reception of the transaction request transferred from the memory 300 of one of the dispatcher apparatus (for example, the dispatcher apparatus 100-1), in order to cause the APP server 120-1 and the like to process a part of the requested transaction. The status returning unit 420 returns, to the dispatcher apparatus 100-1, the status of a transaction response to the transaction request that the request transmitter 410 has transmitted to the APP server 120-1 and the like, as the operation status of the APP server 120-1, the transaction response included in the transaction request transferred from the memory 300 of the dispatcher apparatus 100-1.

Here, the status of a transaction response indicates a time required from transmission of a transaction request until reception of the transaction response, for example. In other words, as an example of processing, the request transmitter 410 resets a timer when transmitting a transaction request to the APP server 120-1, refers to the value of the timer when receiving a transaction response to the transaction request, and measures a time required for the processing. In this manner, the required time indicates the status of the transaction response.

The second table updating unit 430 updates the status table already stored in the memory 400 by use of the received status table, in response to the reception of the status table from the table transmitter 330 of one of the dispatcher apparatus (for example, the dispatcher apparatus 100-1). The second table updating unit 430 may store the received status table in the memory 400 when no status table is stored in the memory 400. In response to the update of the status table, the table returning unit 440 returns the updated status table to each of the dispatcher apparatuses. The return destination is not limited to the transmission source of the status table to the second table updating unit 430, but is all of the dispatcher apparatuses 100 connected directly to the servlet server 110-1. Furthermore, the status table to be returned may be transmitted in a manner included in the messages of transaction responses from the servlet servers 110-1 to -4 to the dispatcher apparatuses 100-1 to -2.

As described above with reference to FIGS. 3 and 4, in the information system 10, the dispatcher apparatuses 100 and the servlet servers 110 transmit status tables to each other and reflect their contents. With this, it is possible to cause the operation status of each server/apparatus to be appropriately shared between the dispatcher apparatuses 100-1 to -2 and the servlet servers 110-1 to -4. Even in a case where the operation status is normal but a single transaction accidentally takes time for processing, it is possible for each server/apparatus to prevent the status from being mistakenly judged, by updating the status table already stored in response to a plurality of received status tables.

FIG. 5 shows an example of a data structure of a status table stored in the storage devices 300 or 400. Each of the storage devices 300 and 400 stores the operation statuses of the servers/apparatuses identified with the servers' IDs as status tables while associating the tables with the servers' IDs. Moreover, each of the storage devices 300 and 400 further stores version IDs which show the time of revising the status tables while associating the status tables with the version IDs. Note that the storage devices 300 and 400 are independently managed in the dispatcher apparatuses 100 and the servlet servers 110, respectively.

As a specific example, the memory 300 stores the server ID of the servlet server 110-1 in association with the normal status as the operation status of the server. On the other hand, the memory 300 stores the server ID of the APP server 120-1 in association with the suspicious heavy-load status as the operation status of the server. In addition, the memory 300 stores the server ID of the DB server 130 in association with the normal status as the operation status of the server. The version ID allows the time and order of a revision to be discriminated. Accordingly, judgment can be made as to whether or not the status table should be updated. The following are the specific descriptions.

With regard to processing related to a version ID in the storage device 300, whenever generating a new status table, the table generator 320 generates a version ID in association with the new status table, the version ID indicating that the new status table is generated in a revision after a previously generated status table is generated, and stores the version ID in the storage device 300. For example, if a version ID is managed as an integer value, the table generator 320 increments an already stored version ID and stores the version ID in the memory 300, whenever generating a new status table. The cycle to generate a status table is determined, in common to the dispatcher apparatuses 100-1 to -2, to be every several minutes or every several seconds, for example. For this reason, although the IDs of status tables generated are approximately synchronous, they are not necessarily in perfect synchronization, since the processing to keep synchronization between the dispatcher apparatuses 100-1 and 100-2 is not performed.

Furthermore, the table transmitter 330 reads a status table which has been generated by the table generator 320 and has been stored in the memory 300 from the memory 300 while associating the status table with a version ID, and transmits the status table to each of the servlet servers 110-1 to -4. With regard to processing related to a version ID in the memory 400, on condition that the received version ID in association with the status table indicates a revision performed at the same time as or after the revision indicated by the version ID stored in the memory 400, the second table updating unit 430 updates a status table stored in the memory 400 in response to the received status table. In this case, the second table updating unit 430 stores the received version ID in the memory 400 while associating the version ID with the updated status table.

In addition, in response to the update of the status table, the table returning unit 440 returns the updated status table to each dispatcher apparatus 100 while associating the table with the version ID corresponding to the status table used for the update. Upon receipt of returned table, the first table updating unit 340 updates the status table stored in the storage device 300 by using the received status table, on condition that the received version ID indicates a revision at the same time as or after the revision indicated by the version ID in the storage device 300.

As described above, it is possible to select and refer to the latest status table alone, even if the arrival of a part of a status table is delayed due to congested communication traffic, since a status table is managed in association with a version ID.

Figure 6:
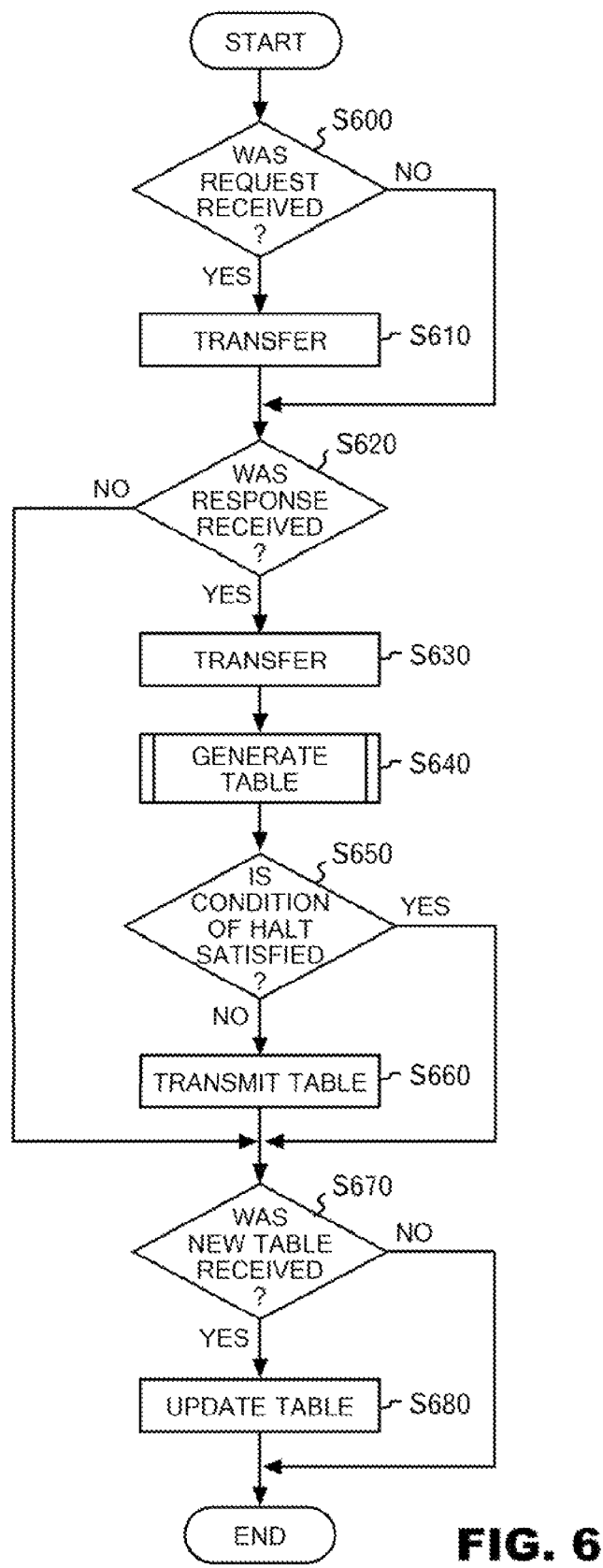
FIG. 6 shows a specific example of processing that the dispatcher apparatus 100-1 transmits and receives a transaction request and a transaction response.

FIG. 6 shows a specific example of processing in which the dispatcher apparatus 100-1 transmits and receives a transaction request and a transaction response. The dispatcher apparatus 100-1 performs the following processing, for example, regularly or whenever receiving some requests/responses. When receiving a transaction request from an external terminal apparatus (S600: YES), the dispatcher apparatus 100-1 transfers the transaction request to a servlet server 110 selected from the plurality of servlet servers 110-1 to -4 (S610). When receiving a transaction response to the transferred transaction request (S620: YES), the transferring unit 310 returns the transaction response to the external terminal apparatus (S630).

Next, the table generator 320 generates a status table in response to the message of the transaction response (S640). Specifically, the table generator 320 obtains the operation status of each of the APP servers 120-1 to -3 and the DB server 130 from the messages of the transaction responses, and evaluates the operation status for each server/apparatus of the APP servers 120-1 to -3 and the DB server 130 in response to the obtained operation status. In addition, the table generator 320 evaluates the operation statuses of the servlet servers 110-1 to -4 in response to a time required from transmission of the transaction request until reception of the transaction response thereof. The evaluated operation status is generated while being included in a status table. A newly generated status table is stored in the storage device 300 by replacing the status table already stored in the storage device 300. Moreover, a version ID is incremented. Additionally, the evaluation for an operation status is based on an operation status included in a plurality of transaction responses received within a predetermined period in the past, and may be made for the same server/apparatus in response to a plurality of operation statuses. Detailed descriptions will be given later. Note that the table generator 320 does not have to update the storage device 300 by using a newly generated status table when the newly generated status table is compared with an already stored status table and found out to be the same as the already stored one. In this case, the table transmitter 330 which will be described later does not have to transmit the status table in S660.

Next, the halt judging unit 350 judges whether or not a condition of halt of transmitting and receiving a status table is satisfied (S650). The condition of halt is that all of the operation statuses of the servlet servers 110-1 to -4 are not in the normal state, for example. This is because in such case, the mutual transmission of status tables between the dispatcher apparatuses 100-1 to -2 and the servlet servers 110-1 to -4 are not performed smoothly. If the condition of halt is not satisfied (S650: NO), the table transmitter 330 reads the generated status table from the storage device 300 and transmits the table to each servlet server 110 (S660). If the condition of halt is satisfied (S650: YES), the table transmitter 330 does not transmit the status table, and moves on to the next processing.

Incidentally, even in the case where the condition of halt is satisfied, the halt judging unit 350 may resume the reception of an operation status by the table generator 320 and the transmission of a status table by the table transmitter 330, on condition that a predetermined period has elapsed after the condition is satisfied. In a case where the condition of halt is satisfied immediately after the resumption, the halt judging unit 350 stops the reception of the operation status and the transmission of the status table, and then waits for a period longer than the above predetermined period. After the period elapsed, the halt judging unit 350 resumes the reception of the operation status and the transmission of the status table. In this manner, it is possible to reduce the load of the information system 10 as much as possible upon failure occurrence and to facilitate restoration from the failure, by extending standby time in accordance with the delay in the restoration from a failure.

Furthermore, the first table updating unit 340 judges whether or not new status tables have been received from the servlet servers 110-1 to -4 (S670). In other words, in response to the reception of the status table received from any of the servlet servers 110-1 to -4, the first table updating unit 340 judges whether or not the version ID received in association with the status table indicates a revision at the same time as or after the revision indicated by the version ID already stored in the storage device 300. Having been revised at the same time as or after means that the number of the received version ID is the same as or greater than the number of the version ID already stored, for example. On condition that the new status table has been received (S670: YES), the first table updating unit 340 updates the status table stored in the storage device 300 by use of the received status table (S680).

Note that when receiving status tables from the servlet servers 110 while performing processing to generate a new status table, it is desirable that the table transmitter 330 should transmit a newly generated status table, and then the first table updating unit 340 should try to update the status table. In this manner, it is possible to increase the information on a time required for the evaluation of an operation status in the whole information system 10, by giving priority to the evaluation for the operation status according to a time required for processing and the like. Consequently, the accuracy of the evaluation of an operation status can be increased.

Figure 7:
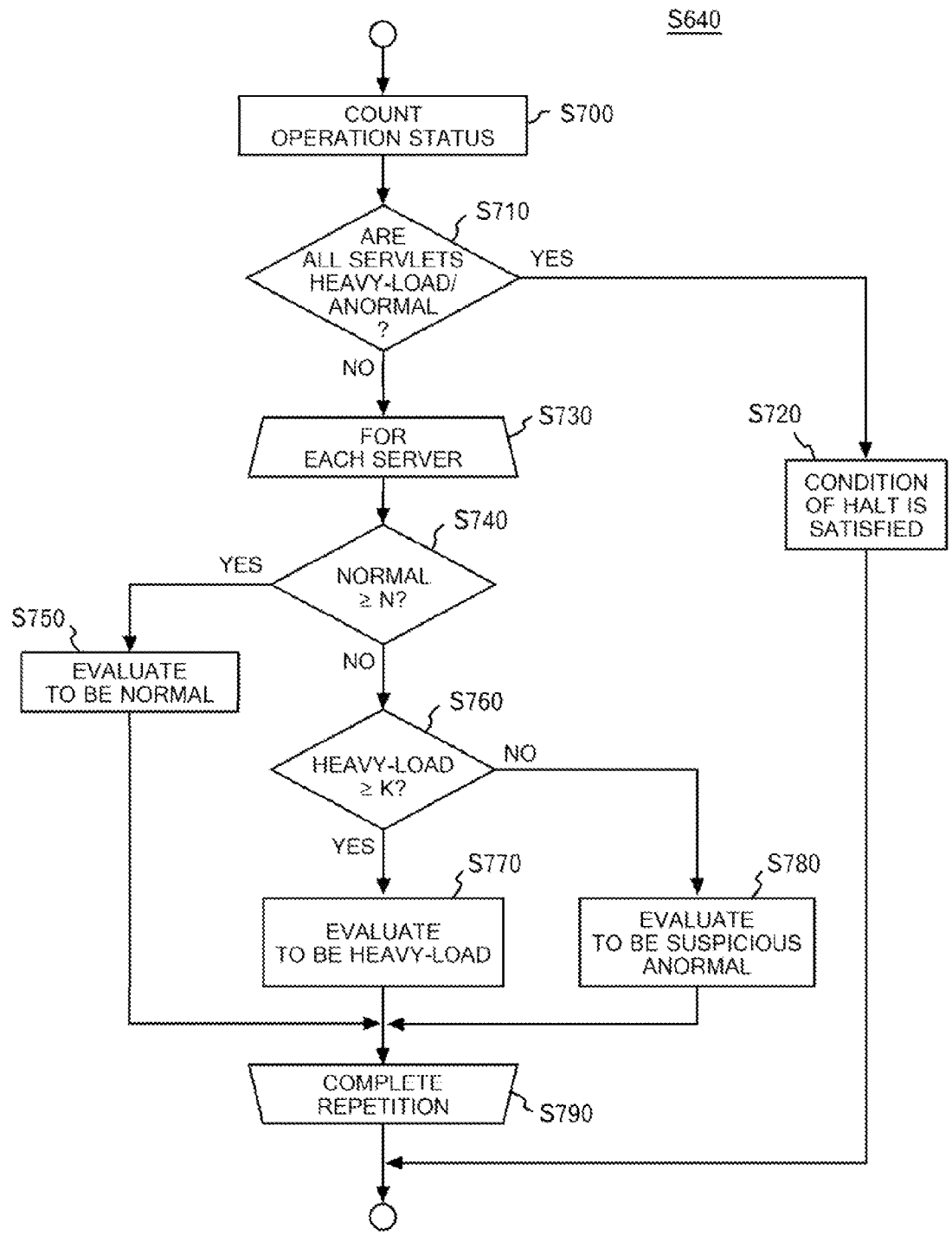
FIG. 7 shows a detailed example of processing in S640.

FIG. 7 shows a detailed example of processing in S640. With reference to FIG. 7, detailed descriptions will be given of processing in which the table generator 320 evaluates the operation status of each apparatus/server in response to the message of a transaction response received by the transferring unit 310. The table generator 320 receives the operation statuses of the each server/apparatus included in the statuses of a plurality of transaction responses received from the servlet servers 110-1 to -4 within a predetermined time in the past, and then counts the received operation statuses (S700). An example of the specific processing will hereinafter be described.

Firstly, the table generator 320 performs the following processing for each transaction response. The table generator 320 computes a time required from transmission of the corresponding transaction request until reception of the transaction response thereof. This is carried out by resetting a timer upon transmitting a transaction request in the table generator 320 and referring to the timer upon receiving a transaction response. This time is set as a time A. Moreover, the table generator 320 obtains, from the messages of the transaction responses, the time required for the transactions requested by the servlet servers 110 to the APP servers 120, in response to the transaction request. This time is set as a time B. Then, the table generator 320 computes the time required for processing in the servlet servers 110 by subtracting the time B from the time A.

When the APP servers 120 have further requested transactions to the DB server 130 following the transaction request, the table generator 320 further obtains the required time from the messages. This time is set as a time C. In this case, the table generator 320 computes the time required for processing in the APP servers 120 by subtracting the time C from the required time B measured in the servlet servers 110. In this manner, the table generator 320 computes the time required for each of a plurality of transactions derivatively and sequentially requested from one transaction request. The required time is converted into the information of an operation status while setting the above-mentioned five and two seconds to be the threshold values. The table generator 320 performs the above processing for each transaction response received within the above-mentioned predetermined time in the past. Then, the table generator 320 counts the operation status judged in this manner in each of the servlet servers 110-1 to -4, the APP servers 120-1 to -3, and the DB server 130.

Next, the table generator 320 judges whether or not any of operation statuses counted regarding the servlet server 110 indicates heavy-load or abnormal statuses for each of the servlet servers 110-1 to -4 (S710). On condition that any of the counted operation statuses indicates the heavy-load or abnormal statuses concerning all of the servlet servers 110 (S710: YES), the halt judging unit 350 judges that the condition of the halt of transmitting and receiving a status table is satisfied (S720), and completes the processing in the drawing. In this case, the table generator 320 does not have to generate a status table.

Next, the table generator 320 processes the following for each of the APP servers 120-1 to -3 and the DB server (hereinafter targeted processing is referred to as a relevant server) (S730). On condition that the ratio of operation statuses indicting that the relevant server operates normally, to all the received operation statuses is a predetermined reference value (N) (S740: YES), the table generator 320 evaluates the relevant server to be in the normal status (S750). It is desirable that the reference value (N) should be an extremely small value larger than 0. This is because once an anomaly occurs in a server, the following processing tends to be further delayed, and the situation rarely improves even temporarily. In other words, when processing which can be judged to be normal is slightly observed, it is hard to consider that the processing has accidentally been completed normally in the abnormal status, and it is natural to consider that other processing is accidentally taking time in the normal status. Hence, the table generator 320 can evaluate that the relevant server is in the normal status as long as one operation status showing the normal status is included.

When the relevant server is not evaluated to be in the normal status (S740), the table generator 320 then judges whether or not the ratio of operation statuses indicating that the relevant server operates under heavy-load, to all the received operation statuses is equal to or more than a predetermined reference value (K) (S760). On condition that the ratio is equal to or more than the reference value (K) (S760: YES), the table generator 320 evaluates that the relevant server is in the heavy-load status (S770). It is desirable that the reference value (K), too, should be an extremely small value larger than 0. The table generator 320 may judge that the relevant server is in the heavy-load status even if the other operation statuses show the abnormal statuses as long as even one operation status indicating that the heavy-load status is included. On condition that the ratio of operation statuses indicating that the relevant server operates under heavy-load, to all the received operation statuses is less than the reference value (K) (S760: NO), the table generator 320 judges that the relevant server is in the suspicious abnormal status (S780). The table generator 320 repeats the above processing for each of the APP servers 120-1 to -3 and the DB server 130 (S790).

Figure 8:
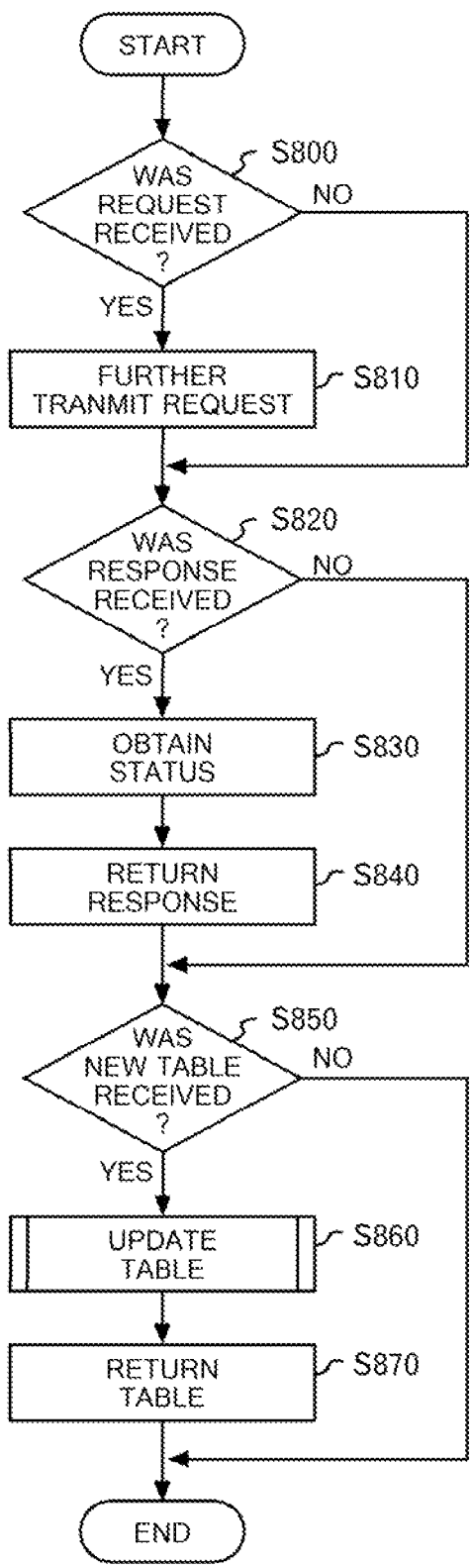
FIG. 8 shows a specific example that the servlet server 110-1 transmits and receives a transaction request and a transaction response.

FIG. 8 shows a specific example of processing that the servlet server 110-1 transmits and receives a transaction request and a transaction response. In response to the reception of a transaction request transferred from the storage device 300 of one of the dispatcher apparatus (for example, the dispatcher apparatus 100-1) (S800: YES), the request transmitter 410 transmits the transaction request to the APP server 120-1 and the like in order to cause the APP servers 120-1 to -3 to process a part of the requested transaction (S810). Assume that the destination is set to be the APP server 120-1, for example. When the request transmitter 410 receives a transaction response to the transaction request that the request transmitter 410 has transmitted to the APP server 120-1 (S820: YES), the status returning unit 420 obtains the status of the transaction response as the operation status of the APP server 120-1 (S830). A time required from the transaction request to the transaction response may be obtained from the APP server 120-1, for example. Then, the status returning unit 420 returns the operation status of the APP server 120-1 to the dispatcher apparatus 100-1, the operation status included in the transaction response to the transaction request transferred from the storage device 300 of the dispatcher apparatus 100-1 (S840).

Next, the second table updating unit 430 judges whether or not a new status table has been received from one of the dispatcher apparatuses (for example, the dispatcher apparatus 100-1) (S850). In other words, in response to the reception of the status table from the dispatcher apparatus 100-1, the second table updating unit 430 judges to have received a new status table, on condition that a version ID received in association with the status table indicates a revision at the same time as or after the revision indicated by the version ID already stored in the storage device 400. On condition that the new status table has been received (S850: YES), the second table updating unit 430 updates the status table stored in the storage device 400, by use of the received status table (S860). In this manner, a status table is updated every time a status table is received. Accordingly, the information on status tables received from each of the dispatcher apparatuses 100-1 to -2 is combined and reflected on the status table of the storage device 400. Then, the table returning unit 440 returns the updated status tables to each of the dispatcher apparatuses 100-1 to -2 (S870).

Figure 9:
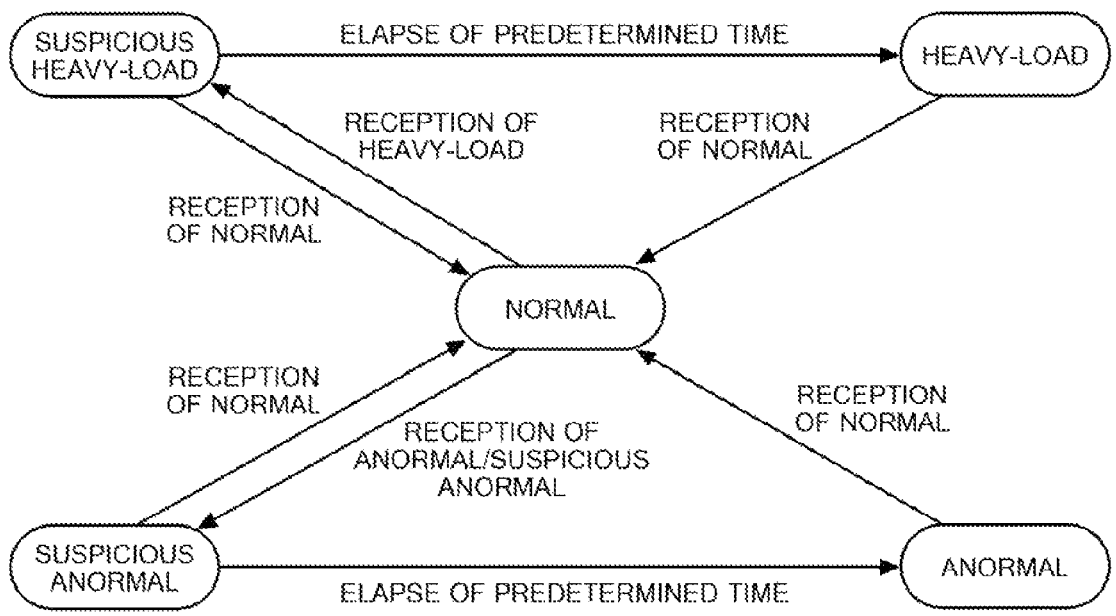
FIG. 9 is a state transition diagram of operation statuses sequentially updated in S860.

FIG. 9 is a state transition diagram of operation statuses sequentially updated in S860. The second table updating unit 430 updates each of the operation statuses of the APP servers 120-1 to -3 and the DB server 130, the statuses being managed in a status table, in accordance with the state transition diagram shown in FIG. 9. Specifically, on condition that the operation status of a server targeted for processing is not in the normal status in a status table already stored in the storage device 400 but is in the normal status in a status table received from the table transmitter 330 of the dispatcher apparatuses 100, the second table updating unit 430 updates the operation status of the relevant server to the normal status. In other words, any of the heavy-load, abnormal, suspicious heavy-load and suspicious abnormal statuses is updated to the normal status on condition that the normal status is received.

Additionally, on condition that the operation status of a server targeted for processing is in the normal status in a status table already stored in the storage device 400 and is in the abnormal or suspicious abnormal status in a status table received from the table transmitter 330 of the servlet server 110, the second table updating unit 430 updates the operation status of the relevant server to the suspicious abnormal status. In other words, even if the abnormal status has been received, it is not immediately judged in the second table updating unit 430 to be in the abnormal status. Then, on condition that the predetermined period has elapsed without restoring the operation status to the normal status after updating the operation status to the suspicious abnormal status, the second table updating unit 430 updates the operation status to the abnormal status.

Furthermore, on condition that the operation status of a server targeted for processing is in the normal status in a status table already stored in the storage device 400 and is in the heavy-load status in a status table received from the table transmitter 330 of the servlet server 110, the second table updating unit 430 updates the operation status of the relevant server to the heavy-load status. In other words, even if the heavy-load status has been received, it is not immediately judged in the second table updating unit 430 to be in the heavy-load status. Then, on condition that the predetermined period has elapsed without restoring the operation status to the normal status after updating the operation status to the suspicious heavy-load status, the second table updating unit 430 updates the operation status to the heavy-load status.

FIG. 10 shows the process that operation statuses are sequentially updated by the information system 10 according to the embodiment. For convenience of explanation here, it is assumed that the information system 10 includes the dispatcher apparatuses 100-1 to -2, the servlet server 110-1, and the APP servers 120-1 to -3, and that does not include the servlet server 110-2 and the DB server 130. Additionally, the APP servers 120-1 to -3 are represented as A to C, respectively, in the table. Moreover, the initial value of a version ID is set to 0. In other words, storage devices in all servers/apparatuses store the numeric value of 0 as the version ID. Furthermore, it is assumed that a status table includes the operation statuses of the APP servers 120-1 to -3, and that does not include the operation statuses of the servlet servers 110-1 to -2.

At the point of a time 0 to be the initial status, the storage device 300 of the dispatcher apparatus 100-1 stores a status table in which any of the operation statuses of the APP servers 120-1 to 3 are the normal statuses. This status table is represented as A, B, C. The same goes for the storage device 300 of the dispatcher apparatus 100-2 and the storage device 400 of the servlet server 110-1. At the point of a time 1 after the time 0, the table generator 320 judges the operation status of the APP server 120-3 to be the suspicious abnormal status. This is because, for example, any of processings carried out in the APP server 120-1 within a fixed period in response to a request from the dispatcher apparatus 100-1 needed the time required for the statuses to be judged as the abnormal statuses. The status table at this time is represented as A, B, and C (–). The symbol – indicates the abnormal status, and the symbol (–) indicates the suspicious abnormal status. At this point, the version ID is incremented to be 1 in the storage device 300 of the dispatcher apparatus 100-1. However, the version ID is still 0 in the servlet server 110-1. Hence, the version ID is described as 0 in the table.

At a time 2, the second table updating unit 430 of the servlet server 110-1 receives a status table from the table transmitter 330 of the dispatcher apparatus 100-1. The APP server 120-3 is in the normal status in the status table already stored in the storage device 300, but the APP server 120-3 is in the suspicious abnormal status in the received status table. Accordingly, the second table updating unit 430 of the servlet server 110-1 updates the operation status to the suspicious abnormal status. Hence, the status table shows A, B, and C (–) also in the servlet server 110-1.

Furthermore, at the same time 2, the table generator 320 of the dispatcher apparatus 100-2 generates a status table independently from the dispatcher apparatus 100-1, slightly later than the dispatcher apparatus 100-1. At this point, the table generator 320 judges the operation status of the APP server 120-2 to be the suspicious abnormal status. This is because the time required for the status to be judged as the abnormal status is needed for any of processings carried out in the APP server 120-2 in response to a request received from the dispatcher apparatus 100-2 within a fixed period, for example. The status table generated as a result shows A, B (–), and C. At this point, all version IDs of the dispatcher apparatuses 100-1 to -2 and the servlet server 110-1 become 1.

At a time 3, the table returning unit 440 of the servlet server 110-1 transmits status tables to the dispatcher apparatuses 100-1 and 100-2. In the dispatcher apparatus 100-1, the stored status table and the received status table are the same. Accordingly, no processing is carried out. In the dispatcher apparatus 100-2, the two version IDs in the stored and received status tables are 1 and identical. Accordingly, the first table updating unit 340 updates the stored status table by use of the received status table. For example, the stored status table is replaced by use of the received status table. As a result, the status table indicates A, B, C (–) in the storage device 300 of the dispatcher apparatus 100-2.

At a time 4, the table generator 320 of the dispatcher apparatus 100-2 judges again that the operation status of the APP server 120-2 is in the suspicious abnormal status. This is because any of the processings carried out in the APP server 120-2 in response to a request of the dispatcher apparatus 100-2 needed the time required for the status to be judged as the abnormal status even in the next fixed period. A status table generated as a result indicates A, B (–), and C. In addition, the generated version ID is 2. Then, in the next time 5, the table transmitter 330 of the dispatcher apparatus 100-2 transmits the generated status table to the servlet server 110-1.

The second table updating unit 430 of the servlet server 110-1 updates a stored status table by use of the received status table, since the number of the received version ID 2 is greater than that of the stored version ID 1. With regard to the APP server 120-2, the stored operation status is the normal status, and the received operation status is the suspicious abnormal status. Accordingly, the second table updating unit 430 updates the operation status of the APP server 120-2 to the suspicious abnormal status. With regard to the APP server 120-3, the stored operation status is the suspicious abnormal status, and the received operation status is the normal status. Accordingly, the second table updating unit 430 updates the operation status of the APP server 120-3 to the normal status. As a result, the status table indicates A, B (–), and C.

At the next time 6, the table returning unit 440 of the servlet server 110-1 returns the updated status table to each of the dispatcher apparatuses 100-1 to -2. In the dispatcher apparatus 100-2, the already stored status table and the received status table are the same. For this reason, the first table updating unit 340 carries out no processing. On the other hand, the servlet server 110-1 receives the status table A, B (–), and C, which is different from the stored status table, and also replace the stored status table with the received status table since the version IDs indicates that the revision is made at the same period of time. As a result, the status table becomes A, B (–), and C.

At the next times 7 and 8, the table generators 320 of the dispatcher apparatuses 100-1 to -2 evaluate the operation statuses of the APP servers 120-1 to -3. However, the operation statuses are the same as those before the evaluation. Hence, the descriptions of the operation statuses do not change in FIG. 10. Similarly, the second table updating unit 430 of the servlet server 110-1 receives the status tables from the dispatcher apparatuses 100-1 to -2. However, the status table is the same as the already stored status table. Hence, the description of the status table does not change in FIG. 10.

At a time 9, the second table updating unit 430 of the servlet server 110-1 updates the operation status of the APP server 120-2 to the abnormal status, since a predetermined time has elapsed after the update of the operation status of the APP server 120-2 to the suspicious abnormal status. The updated operation statuses are returned to the dispatcher apparatuses 100-1 to -2 while the updated operation statuses are included in the status table. As a result, the status table indicates A, B-, and C. At a time 10, the first table updating units 340 of the dispatcher apparatuses 100-1 to -2 updates the already stored status tables by use of the received status tables. As a result, the status tables indicate A, B-, and C.

Figure 11:
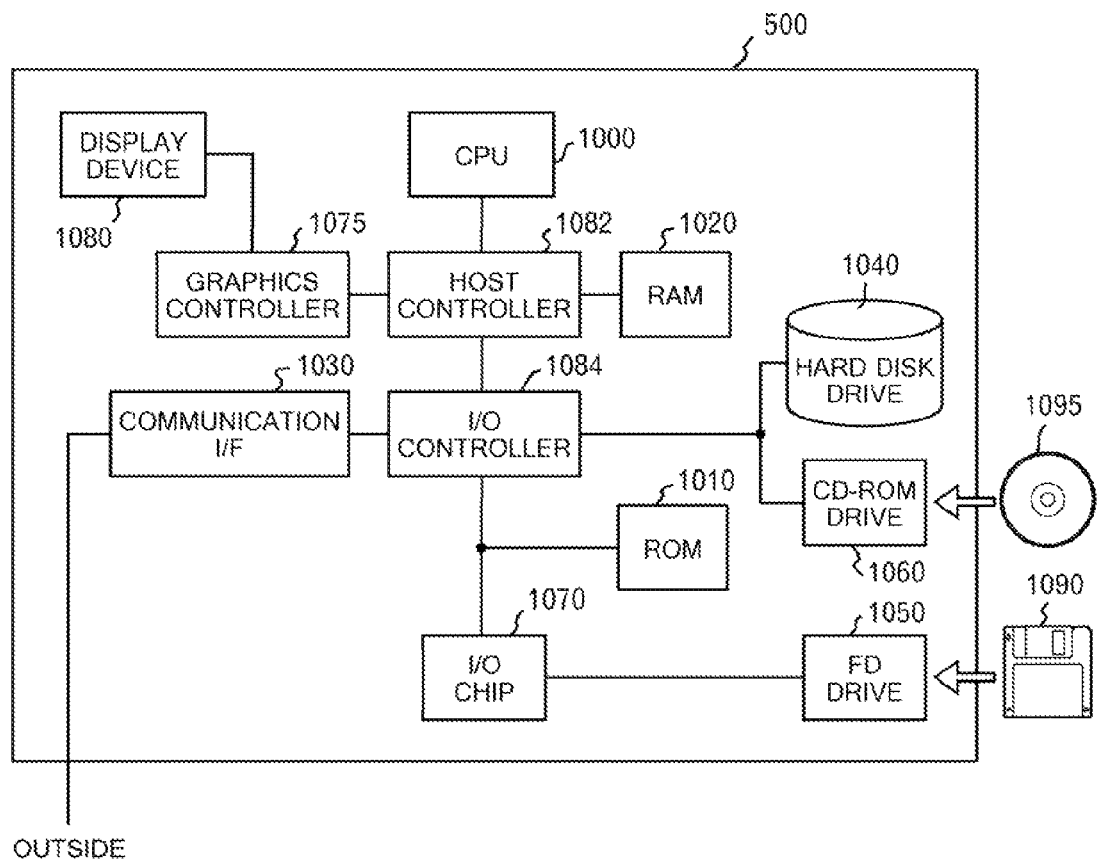
FIG. 11 shows an example of a hardware configuration of an information processing apparatus 500 functioning as the dispatcher apparatus 100-1 or the servlet server 110-1.

FIG. 11 shows an example of a hardware configuration of an information processing apparatus 500 functioning as the dispatcher apparatus 100-1 or the servlet server 110-1. The information processing apparatus 500 includes a CPU peripheral unit, an input/output unit, and a legacy input/output unit. The CPU peripheral unit includes the CPU 1000, the RAM 1020, and a graphics controller 1075, all of which are mutually connected to one another via a host controller 1082. The input/output unit includes the communication interface 1030, the hard disk drive 1040, and a CD-ROM drive 1060, all of which are connected to the host controller 1082 via an input/output controller 1084. The legacy input/output unit includes a ROM 1010, a flexible disk drive 1050, and an input/output chip 1070, all of which are connected to the input/output controller 1084.

The host controller 1082 connects the RAM 1020 to the CPU 1000 and the graphic controller 1075, both of which access the RAM 1020 at a higher transfer rate. The CPU 1000 is operated in accordance with programs stored in the ROM 1010 and the RAM 1020, and controls each of the components. The graphics controller 1075 obtains image data that the CPU 1000 or the like generates in a frame buffer provided in the RAM 1020, and causes the obtained image data to be displayed on a display device 1080. Instead of this, the graphics controller 1075 may internally include a frame buffer in which the image data generated by the CPU 1000 or the like is stored.

The input/output controller 1084 connects the host controller 1082 to the communication interface 1030, a hard disk drive 1040, and the CD-ROM drive 1060, all of which are relatively high-speed input/output devices. The communication interface 1030 communicates with an external device via a network. In the hard disk drive 1040, programs and data used by the information processing apparatus 500 are stored. The CD-ROM drive 1060 reads a program or data from a CD-ROM 1095, and provides the RAM 1020 or the hard disk drive 1040 with the read-out program or the data.

Furthermore, the input/output controller 1084 is connected to relatively low-speed input/output devices such as the ROM 1010, the flexible disk drive 1050 and the input/output chip 1070. In the ROM 1010, stored are programs such as a boot program executed by the CPU 1000 at a start-up time of the information processing apparatus 500 and a program depending on hardware of the information processing apparatus 500. The flexible disk drive 1050 reads a program or data from a flexible disk 1090, and provides the RAM 1020 or the hard disk drive 1040 with the read-out program or the data, via the input/output chip 1070. The input/output chip 1070 is connected to the flexible disk 1090 and various kinds of input/output devices, for example, through a parallel port, a serial port, a keyboard port, a mouse port, and the like.

A program to be provided to the information processing apparatus 500 is provided by a user with the program stored in a storage medium such as the flexible disk 1090, the CD-ROM 1095, and an IC card. The program is read from the storage medium via the input/output chip 1070 and/or the input/output controller 1084, and is installed and executed on the information processing apparatus 500. An operation that the program causes the information processing apparatus 500 or the like to execute, is identical to the operation of the dispatcher apparatus 100-1 and the servlet server 110-1 described by referring to FIGS. 1 to 10. Accordingly, the description thereof will be omitted here. Note that description will also be omitted of operations and hardware configurations of the dispatcher apparatus 100-2 and the servlet servers 110-2 to -4 since the operations and the hardware configurations are substantially identical to the operation of the information processing apparatus 500 shown in FIG. 11.

The program described above may be stored in an storage medium. As the storage medium, any one of the following media may be used: an optical storing medium such as a DVD and a PD; a magneto-optical storage medium such as an MD; a tape medium; and a semiconductor memory such an IC card, in addition to the flexible disk 1090 and the CD-ROM 1095. Alternatively, the program may be provided to the information processing apparatus 500 via a network, by using, as a storage medium, a storage device such as a hard disk and a RAM, provided in a server system connected to a private communication network or to the Internet.

As described above, according to the information system 10 of the embodiment, it is possible to transmit and receive an operation status by including in a message such as a transaction request and a transaction response. Accordingly, an additional apparatus is not required other than originally necessary apparatuses and servers. Furthermore, it is possible to detect a wide range of failures including failures originated from software. Moreover, even in a case where the relation of calls is hierarchical in a manner that a server A requests a transaction to another server B and the server B then requests the transaction to a server C, it is possible to accurately judge the spot of causing a failure. In addition, by exchanging the evaluation results of the operations statuses between the dispatcher apparatuses 100 and the servlet servers 110, it is possible to correct wrong evaluation and a mistake in temporary evaluation. For example, it is possible to avoid mistakenly judging a transaction delayed temporarily due to a GC of Java (a registered trademark), and to increase the accuracy of operation status evaluation.

Hereinabove, the present invention has been described by using the embodiment, but the technical scope of the present invention is not limited to the aforementioned embodiment. It is obvious to those skilled in the art that various modifications and improvements can be made in the aforementioned embodiment. It is obvious from the description of the scope of claims that a modified or improved embodiment is also included in the technical scope of the present invention.

What is claimed is:

1. A system comprising:
    a plurality of dispatcher apparatuses which dispatch a transaction request by an external terminal apparatus;
    a plurality of first-tier servers which process the dispatched transaction request; and
    a second-tier server which processes a part of the transaction request in response to a request received from a first-tier server;
    wherein each of the dispatcher apparatuses comprises:
        a dispatcher storage device which stores a status table indicating an operation status of the second-tier server;
        a transferring unit which transfers a transaction request received from the external terminal apparatus to the first-tier server selected from the plurality of first-tier servers, in order to dispatch the requested transaction;
        a table generator which receives the operation status of the second-tier server included in a transaction response corresponding to the transferred transaction request, which evaluates the operation status of each of the second-tier servers based on the received operation status, which generates the status table indicating the operation status of the second-tier server, and which stores the status table in the dispatcher storage device;

a table transmitter which reads the status table from the dispatcher storage device in response to the generation of the status table, and which transmits the status table to each of the first-tier servers; and a first table updating unit which updates the status table stored in the dispatcher storage device by use of the status table received in response to the reception of the status table from any of the first-tier servers; and wherein each of the first-tier servers comprises:

a server storage device which stores the status table indicating the operation status of the second-tier server;

a request transmitter which transmits the transaction request to the second-tier server in response to the reception of the transaction request transferred from the transferring unit of one of the dispatcher apparatuses, in order to cause the second-tier server to process a part of the transaction request;

a status returning unit which returns, to the dispatcher apparatus, a status of the transaction response to the transaction request transmitted to the second-tier server, as the operation status of the second-tier server, the status of the transaction response included in the transaction response to the transaction request transferred from the transferring unit of the dispatcher apparatus;

a second table updating unit which updates the status table already stored in the server storage device by use of the status table received from the table transmitter of the dispatcher apparatus, in response to the reception of the status table; and a table returning unit which returns the status table to each of the dispatcher apparatuses, in response to the update of the status table.

2. The system according to claim 1, wherein:

the dispatcher storage device in each of the dispatcher apparatuses and the first-tier servers further stores a version ID indicating the time of revising the status table in association with the status table, whenever generating a new status table, the table generator generates a version ID in association with the new status table, the version ID indicating that the new status table is generated in a revision after the status table is generated, and stores the version ID in the dispatcher storage device, the table transmitter reads the new status table from the dispatcher storage device in association with the version ID, and transmits the status table to each of the first-tier servers, on condition that the received version ID in association with the status table indicates a revision performed at the same time as or after the revision indicated by a version ID stored in the storage device, the second table updating unit updates the status table stored in the storage device by use of the status table received, and further stores the received version ID in the storage device in association with the updated status table, in response to the update of the status table, the table returning unit returns the status table to each of the dispatcher apparatuses in association with the version ID corresponding to the status table used for the update, and on condition that the received version ID in association with the status table indicates a revision performed at the same time as or after the revision indicated by the version ID stored in the dispatcher storage device, the first table updating unit updates the status table stored in the dispatcher storage device.

3. The system according to claim 1, wherein:

the status returning unit returns, to the dispatcher apparatus, the transaction response to the transaction request transferred from the transferring unit of the dispatcher apparatus, the transaction response including as the operation status information indicating a time required for a process requested to the second-tier server in response to the transaction request, and the table generator receives, as the operation status from one of the first-tier servers, the transaction response to the transaction request which contains the time required for the process corresponding to the transaction request transferred to the first-tier server.

4. The system according to claim 1, wherein:

the table generator further evaluates the operation status of each of the first-tier servers according to a time required from transmission of the transaction request to each of the first-tier servers until reception of the transaction response to the transaction request, and generates the status table including the evaluation, and each of the dispatcher apparatuses further comprises a halt judging unit which stops the table generator receiving the operation status and the table transmitter transmitting the status table, on condition that the operation statuses of all of the first-tier servers are not in normal statuses in the status table.

5. The system according to claim 1, wherein:

the operation status of the second-tier server is any one of a normal status, a heavy-load status in which the second-tier server is in operation but requires a time equal to or more than a threshold value for processing, and an abnormal status in which the second-tier server is out of operation, and the table generator receives the operation status of second-tier servers, and evaluates each of the second-tier servers as being in the normal status on condition that a ratio of the operation statuses indicating that the second-tier server operates normally is equal to or more than a predetermined reference value.

6. The system according to claim 5, wherein the table generator evaluates, as being in the heavy-load status, each of the second-tier servers not having been evaluated as in the normal status, on condition that a ratio of the operation statuses indicating that the second-tier server operates under heavy-load is equal to or more than the reference value.

7. The system according to claim 1, wherein:

the operation status of the second-tier server is any one of a normal status, a heavy-load status in which the second-tier server is in operation but requires a time equal to or more than a threshold value for processing, an abnormal status in which the second-tier server is out of operation, a suspicious heavy-load status in which the second-tier server is suspected to be in the heavy-load status, and a suspicious abnormal status in which the second-tier server is suspected to be in the abnormal status, and the second table updating unit updates the operation status of second-tier servers to the normal status, on condition that the operation status of the second-tier server is not in the normal status in the status table already stored in the server storage device but is in the normal status in the status table received from the table transmitter of the dispatcher apparatus.

8. The system according to claim 7, wherein the second table updating unit updates the operation status of each of the second-tier servers to the suspicious abnormal status, on condition that the operation status of the second-tier server is in the normal status in the status table already stored in the server storage device and is in the abnormal or suspicious abnormal status in the status table received from the table transmitter of the dispatcher apparatus, and further updates the operation status to the abnormal status, on condition that a predetermined period has elapsed without restoring the status to the normal status after the status is updated to the suspicious abnormal status.

9. The system according to claim 7, wherein the second table updating unit updates the operation status of each of the second-tier servers to the suspicious heavy-load status, on condition that the operation status of the second-tier server is in the normal status in the status table already stored in the server storage device and is in the heavy-load status in the status table received from the table transmitter of the dispatcher apparatus, and further updates the operation status to the heavy-load status, on condition that a predetermined period has elapsed without restoring the status to the normal status after the status is updated to the suspicious heavy-load status.

10. A method for managing an operation status in a system including a plurality of dispatcher apparatuses which dispatch a transaction request by an external terminal apparatus, a plurality of first-tier servers which process the dispatched transaction, and a second-tier server which processes a part of the transaction in response to a request of a first-tier server, each of the dispatcher apparatuses including a dispatcher storage device for storing a status table indicating the operation status the second-tier server, each of the first-tier servers including the dispatcher storage device which stores the status table indicating the operation status of each second-tier server, the method comprising the steps in a computer functioning as each of the dispatchers, of:
  causing a transferring unit to transfer the transaction request received from the external terminal apparatus to the first-tier server selected from the plurality of first-tier servers in order to dispatch the transaction request;
  causing the table generator to receive the operation status of the second-tier server included in a transaction response corresponding to the transferred transaction request, to evaluate the operation status of each of the second-tier servers on the basis of the operation status, to generate the status table indicating the operation status of the second-tier server, and to store the status table in the dispatcher storage device;
  causing a table transmitter to read the status table from the dispatcher storage device in response to the generation of the status table, and to transmit the status table to each of the first-tier servers; and
  causing a first table updating unit to update the status table stored in the dispatcher storage device by use of the status table received in response to the reception of the status table from any one of the first-tier servers; and
wherein the method comprising the steps in a computer functioning as each of the first-tier servers, of:
  causing a request transmitter to transmit the transaction request to the second-tier server in response to the reception of the transaction request transferred from the transferring unit of one of the dispatcher apparatuses, in order to cause the second-tier server to process a part of the transaction request;
  causing a status returning unit to return, as the operation status of the second-tier server to the dispatcher apparatus, a status of the transaction response to the transaction request transmitted to the second-tier server, the status of the transaction response included in the transaction response to the transaction request transferred from the transferring unit of the dispatcher apparatus;
  causing a second table updating unit to update the status table already stored in a server storage device by use of the status table received from the table transmitter of the dispatcher apparatus, in response to the reception of the status table; and
  causing a table returning unit to return the status table to each of the dispatcher apparatuses, in response to the update of the status table.

11. A computer program product embodied at least partially in a non-transitory medium for allowing a plurality of information processing apparatuses to function as a system including a plurality of dispatcher apparatuses which dispatch a transaction request by an external terminal apparatus, a plurality of first-tier servers which process the dispatched transactions, and a second-tier server which processes a part of the transaction in response to a request of a first-tier server, the computer program product causing each of the information processing apparatuses to function as each of the dispatcher apparatuses comprising:
  a dispatcher storage device which stores a status table indicating an operation status of the second-tier server;
  a transferring unit which transfers the transaction request received from the external terminal apparatus to the first-tier server selected from the plurality of first-tier servers, in order to dispatch the transaction request;
  a table generator which receives the operation status of each of the second-tier servers included in a transaction response corresponding to the transferred transaction request, which evaluates the operation status of each of the second-tier servers based on the operation status, which generates a status table indicating the operation status of each of the second-tier servers, and which stores the status table in the dispatcher storage device;
  a table transmitter which reads the status table from the dispatcher storage device in response to the generation of the status table, and which transmits the status table to each of the first-tier servers; and
  a first table updating unit which updates the status table stored in the dispatcher storage device by use of the status table received in response to the reception of the status table from any of the first-tier servers; and
wherein the computer program product causing each of the other information processing apparatuses to function as each of the first-tier servers comprising:
  a server storage device which stores the status table indicating an operation status of each second-tier server;
  a request transmitter which transmits the transaction request to the second-tier server in response to the reception of the transaction request transferred from the transferring unit of one of the dispatcher apparatuses, in order to cause the second-tier server to process a part of the transaction request;
  a status returning unit which returns, to the dispatcher apparatus, a status of the transaction response to the transaction request transmitted to the second-tier server, as the operation status of the second-tier server, the status of the transaction response included in the transaction response to the transaction request transferred from the transferring unit of the dispatcher apparatus;

a second table updating unit which updates the status table already stored in the server storage device by use of the status table received from the status table from the table transmitter of the dispatcher apparatus, in response to the reception of the status table; and a table returning unit which returns the status table to each of the dispatcher apparatuses, in response to the update of the status table.

\* \* \* \* \*